United States Patent [19]

Poore et al.

[11] 4,012,185

[45] Mar. 15, 1977

[54] CONFECTION MAKING MACHINE

[75] Inventors: William M. Poore, Huntington Beach; Herbert W. Heckendorf, Upland, both of Calif.

[73] Assignee: Frosty-Bite Confections, Huntington Beach, Calif.

[22] Filed: Jan. 8, 1973

[21] Appl. No.: 322,084

[52] U.S. Cl. .......................... 425/120; 425/126 R; 425/127; 425/360; 425/428

[51] Int. Cl.[2] ...................... A23G 9/08; A23G 9/28

[58] Field of Search .......... 425/117, 118, 134, 261, 425/357, 453, 428, 431, 424 R, 126 R, 127, 385, 112, 220, 217, 120, 360; 141/131, 132; 241/DIG. 17

[56] References Cited

UNITED STATES PATENTS

| | | | |
|---|---|---|---|
| 1,412,727 | 4/1922 | Walsh | 425/242 |
| 1,663,805 | 3/1928 | Martin | 425/357 X |
| 1,899,974 | 3/1933 | Mooney | 425/385 X |
| 2,545,366 | 3/1951 | Mandryl | 425/431 X |
| 2,899,915 | 8/1959 | Tomik | 425/112 |
| 2,945,261 | 7/1960 | Aykanian et al. | 425/DIG. 55 |
| 3,002,249 | 10/1961 | Jackson | 425/134 X |
| 3,122,812 | 3/1964 | Gory | 425/219 X |
| 3,126,841 | 3/1964 | Nay | 425/126 |
| 3,193,903 | 7/1965 | White | 425/220 X |
| 3,279,936 | 10/1966 | Forestek | 425/DIG. 55 |

Primary Examiner—Richard B. Lazarus
Assistant Examiner—John McQuade
Attorney, Agent, or Firm—Gordon L. Peterson

[57] ABSTRACT

A machine for making a confection comprising a conveyor for moving containers through a plurality of stations, an ice depositing device at one of the stations for depositing ice fragments in the containers, a compactor at a second station for compacting the ice in the containers, and a rotor for shaping the ice in the containers.

16 Claims, 8 Drawing Figures

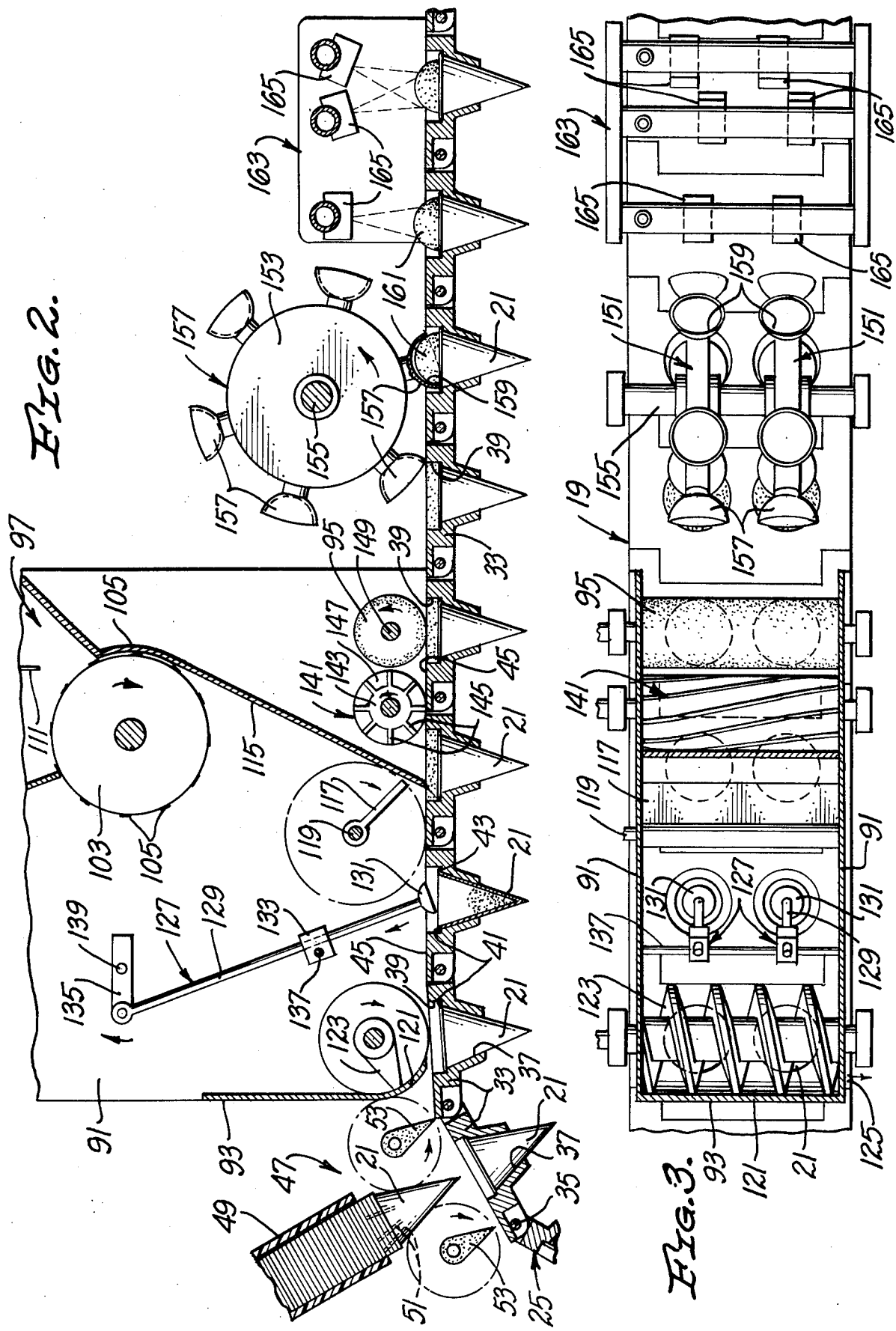

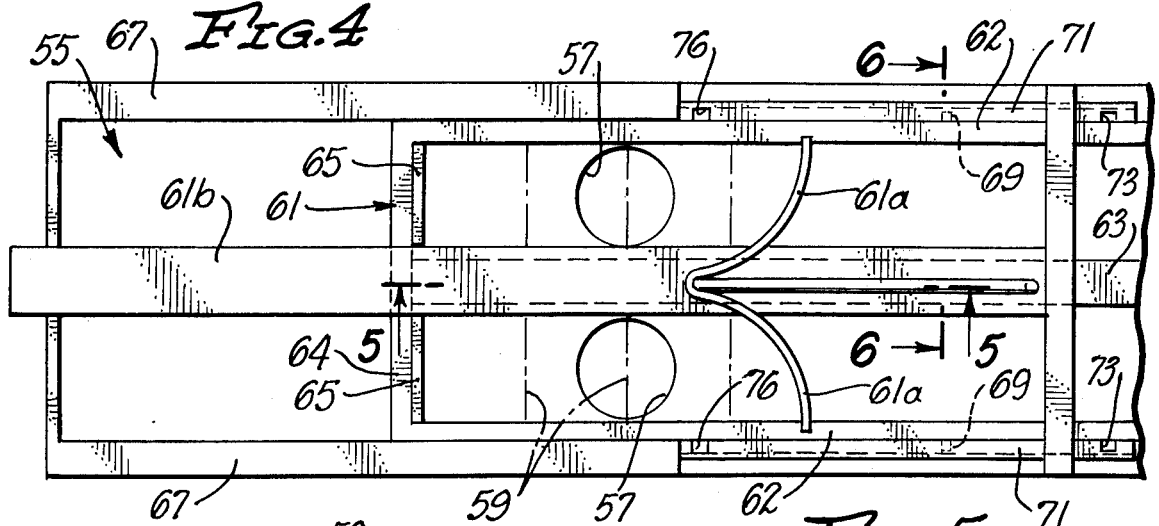
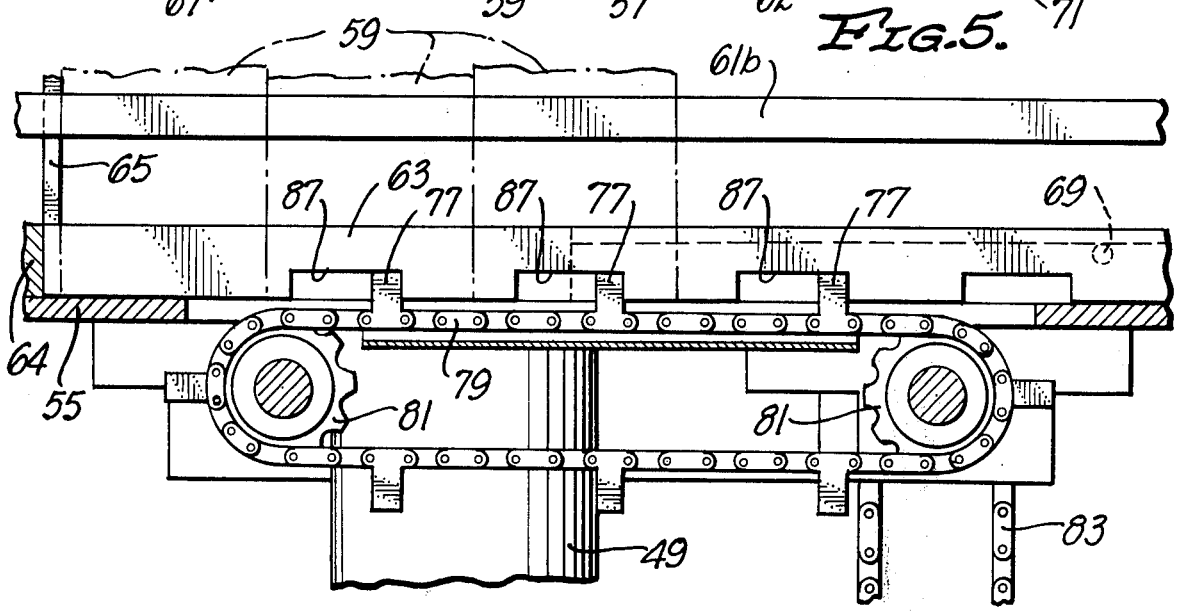
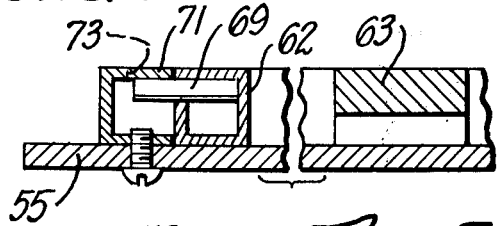
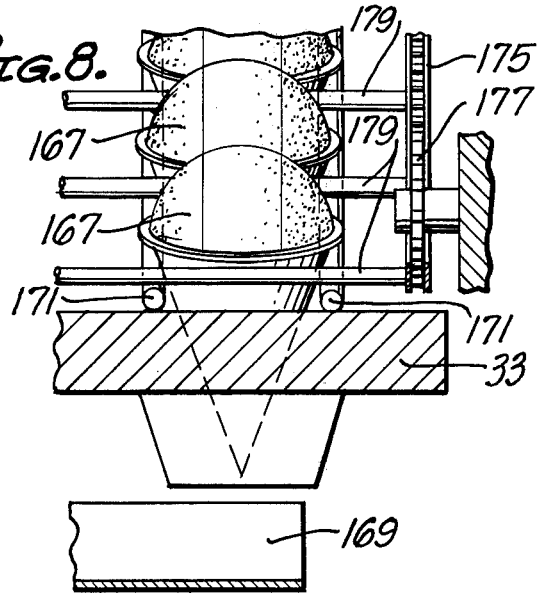
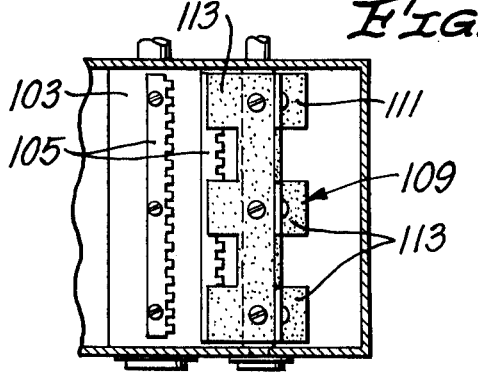

CONFECTION MAKING MACHINE

BACKGROUND OF THE INVENTION

The making of a confection often requires that a metered quantity of edible material be deposited in a cup or container and then appropriately shaped. For example, in making a frozen shaved water-ice confection, commonly known as Sno-cones, ice fragments are deposited in a cup. The ice is then compacted and shaped and then syrup is deposited over the shaped mass.

Heretofore, machines for making confections of this type have been slow and required significant manual effort on the part of an operator. One reason is that the loading of ice fragments into cups is much more difficult than may be expected because they tend to stick to the equipment. In addition, the ice must be compacted in each cup without breaking the cup and without slowing up the production process.

SUMMARY OF THE INVENTION

The present invention provides an automatic machine for making confections such as a confection of the type which includes ice fragments in a cup. One feature of the invention is that the cups are moved continuously rather than intermittently through the machine. This reduces the complexity of the machine as no intermitting mechanisms are required, and it increases production. To accomplish this, the operation of loading cups into a conveyor, loading ice fragments into the cups, compacting the ice fragments in the cup, and shaping the ice fragments are all carried out automatically without stopping the conveyor. Proper ice distribution is facilitated by coating the parts of the machine which contact the ice with a material to which ice will not adhere.

The cups can advantageously be carried through the machine by an endless conveyor. The conveyor includes a plurality of recesses such as openings into which the cups are received. The conveyor moves continuously to thereby carry the cups continuously through several work stations.

A stack of cups is releasably retained adjacent a first station. The cups are individually removed from the stack by a pair of continuously rotatable elements and deposited into an opening of the conveyor. The stack of cups can also be automatically replenished by providing a platform above the first station which carries several additional stacks of cups. These additional stacks of cups are very slowly moved along the platform in timed relationship to movement of the conveyor. Ultimately, the first stack of cups carried by the platform reaches an opening in the platform and drops through a tube and into position adjacent the first station.

Ice fragments are deposited in the cups at a second station along the conveyor. In actual practice of the invention, the second station may cover a relatively long section of the conveyor. The ice loading station is defined by a pair of spaced dams extending across the conveyor and by opposed side walls extending along the side edges of the conveyor between the two dams. An ice shaver delivers ice fragments to a location intermediate the dams.

Ice fragments are very difficult to move and to compact; however, the present invention solves these problems. For example, ice delivered to the conveyor is propelled rearwardly, i.e. opposite the direction of movement of the conveyor between the dams, toward the first dam. This propelling device can advantageously take the form of a rotatable paddle. Thus, the cup adjacent the first dam receives a first stage ice fill as a result of operation of the paddle. Secondly, the paddle throws ice substantially straight downwardly into the cup therebelow and in so doing provides second stage ice fill. This two-stage ice fill has been found very effective in assuring that the cups will be adequately filled with the ice fragments.

An ice compactor is located at a third station. The ice compactor compacts the ice in the cups intermediate the first and second stage ice fill operations. The third station is, therefore, within the second station. The ice compactor is driven generally toward and away from the conveyor and generally in the direction of movement of the conveyor so that the compactor can engage and compact the ice in each of the cups as the cups are continuously fed through the third station.

With the present invention, multiple side-by-side cups can be fed simultaneously through each of these stations. To assure that the ice fragments are spread laterally for the first stage ice fill sufficiently to enter all of the side-by-side cups for the first stage ice fill, an auger can be provided. The auger not only laterally spreads the ice for the first stage ice fill, but also causes excess ice to be moved laterally through an aperture in one of the side walls to thereby rid the machine of excess ice.

Following the second stage ice fill, the containers are fed through a fourth station which is also preferably within the second station, i.e., between the first and second dams. A leveler is located at the fourth station for the purpose of providing a level upper surface on the ice in the cups. The leveler can advantageously take the form of a rotary member having a plurality of grooves each of which extends circumferentially and axially of the rotary member. If the grooves extended only axially or only circumferentially, the grooves would tend to pack with ice fragments so that the leveler would not be able to perform in the desired manner. However, by using a reel-like construction for the leveler, the ice is cammed axially by helical blades, and the spaces between the blades do not become packed with ice fragments.

The second dam preferably includes a roller with the axis of rotation of the roller being transverse to the direction of conveyor movement beneath the roller. If a stationary dam were used at this location, ice fragments may tend to build up behind it. However, the roller prevents this.

A rotor is located at a fifth station downstream of the second dam so that the cups are sequentially brought beneath the rotor after passing beneath the second dam. The rotor includes a plurality of deforming sections which may be generally cup-shaped. The purpose of the deforming sections is to deform the ice in each of the containers to a desired configuration. The deforming of the ice includes shaping and/or further compaction of the ice fragments.

One feature of the rotor is that it rotates in synchronism with the conveyor so that it deforms the ice in each cup as the cups are moved through the fifth station. To further simplify the machine and to assure that the rotor and conveyor move synchronously, the rotor can advantageously be driven by the conveyor through the engagement of the deforming section and the confection and/or the conveyor.

After passing beneath the rotor, the cups pass through a syrup dispenser and syrup is deposited on the ice fragments to thereby form a confection. Subsequentially, the cups are automatically unloaded from the conveyor.

With the present invention, it is only necessary to supply the machine with raw materials, i.e. cups, ice and syrup and to provide for receiving the finished product at the end of the machine. The entire process of making the confection is carried out automatically and is of such a nature that one workman can operate several of the machines. The various rotary ice handling elements prevent the ice fragments from freezing together or packing against parts of the machine.

The invention can best be understood by reference to the following description taken in connection with the accompanying illustrative drawings.

BRIEF DESCRIPTION OF THE DRAWINGS

FIG. 2 is a sectional view on an enlarged scale illustrating the portion of the machine along the conveyor between the cup loading mechanism and the syrup dispenser.

FIG. 3 is a plan view partially in section of the portion of the machine shown in FIG. 2.

FIG. 4 is a plan view taken generally along line 4—4 of FIG. 1.

FIG. 5 is an enlarged sectional view taken generally along line 5—5 of FIG. 4.

FIG. 6 is an enlarged fragmentary sectional view taken generally along line 6—6 of FIG. 4.

FIG. 7 is an enlarged sectional view taken generally along line 7—7 of FIG. 1 showing a portion of the ice shaver.

FIG. 8 is an enlarged fragmentary sectional view taken generally along line 8—8 of FIG. 1 and showing how the confections are automatically removed from the conveyor.

DESCRIPTION OF THE PREFERRED EMBODIMENT

Figure 1:
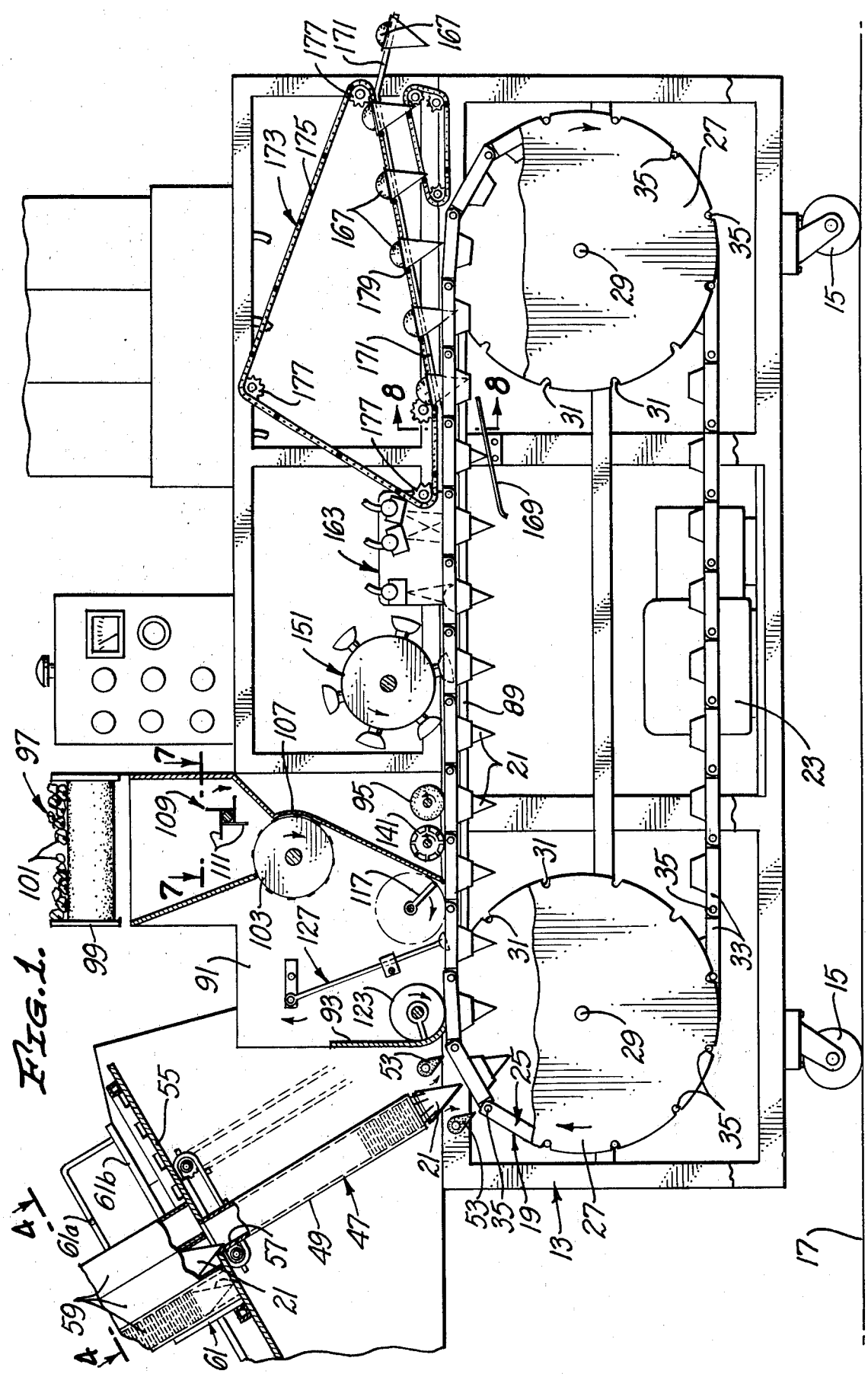
FIG. 1 is a side elevational view with portions broken away of a preferred form of confection making machine constructed in accordance with the teachings of this invention.

FIG. 1 shows a machine 11 for making a frozen water ice confection; however, many of the concepts of this invention on are applicable to machines for making other types of confections. The machine 11 includes a supporting structure 13. The supporting structure 13 includes a plurality of wheels 15 which mount the machine for rolling movement along a supporting surface 17.

The machine 11 includes a conveyor 19 for moving cups or containers 21 through several work stations. Although the conveyor 19 could be different configurations, in the embodiment illustrated it is an endless conveyor which is driven continuously by an electric motor 23 through a suitable drive train (not shown). The conveyor 19 includes a conveyor belt 25 and a pair of conveyor drive wheels 27. Each of the wheels 27 is mounted for rotational movement about an axle 29 which in turn is suitably mounted on the supporting structure 13. Either or both of the wheels 27 can be driven in any suitable manner by the motor 23. Each of the wheels 27 has a plurality of notches 31 circumferentially spaced along the periphery thereof.

The conveyor belt 25 includes a plurality of identical conveyor sections 33 (FIGS. 1 and 2), and a plurality of pins 35 for pivotally interconnecting adjacent conveyor sections. End portions of the pins 35 are receivable in the notches 31 of each of the wheels 27 to permit the wheels to drive the conveyor belt 25.

As best shown in FIG. 2, each of the container sections 33 has a recess or opening which includes a conical bore 37 and a cylindrical pocket or counterbore 39 with an annular shoulder 41 separating the bore and the counterbore. Each of the conveyor sections 33 preferably includes a plurality of the bores and counterbores arranged in side-by-side relationship, and in the embodiment illustrated two of such bores and counterbores are provided (FIG. 3).

The cups 21 may be constructed, for example, of paper. One of the cups 21 is received in each of the conical bores 37. Each of the cups 21 is conical and generally conforms to the conical bore 37. Each of the cups has an annular flange 43 (FIG. 2) which is adapted to rest on the shoulder 41. Thus, the openings in the conveyor sections 33 serve as container mounts for the cups or containers 21. Each of the conveyer sections 33 has an upper face 45 which is generally planar and which lies above the shoulder 41 and the flange 43. Although the machine 11 is adapted for use with the cups 21, obviously the concepts of this invention are applicable to the making of confections which employ cups of different sizes and configurations.

The cups 21 are automatically fed to the conveyor belt 25 by a cup feeding apparatus 47 (FIGS. 1 and 2). The cup feeding apparatus 47 includes an elongated tube 49 in which a stack of the cups 21 are releasably retained in any suitable manner such as by a conventional expandable, slotted annulus 51. A pair of rotatable fingers 53 are suitably mounted on the supporting structure 13 for rotation in synchronism but in the opposite direction as indicated by the arrows in FIG. 2. The fingers 53 have relatively high friction outer ends which simultaneously, frictionally engage the lowermost of the cups 21 and the tube 49 and pull such lowermost cup into the bore 37 of the conveyor section 33 therebelow. The rotation of the fingers 53 is in timed relation to movement of the conveyor belt 25 so that cups 21 will be fed to the conveyor belt as one of the bores 37 is below the tube 49. Another tube 49 and paid of fingers 53 supply cups 21 to the other row of bores 37 in the conveyor belt 25.

The cup feeding apparatus 47 also includes means for supplying cups to the tube 49. As shown in FIGS. 1 and 4, the cup feeding apparatus also includes a stationary, inclined platform or ramp 55 having two openings 57 therein which communicate with the upper ends of the two tubes 49, respectively. Two rows of cartons 59, each of which contains a stack of the cups 21, is positioned on the platform 55 and are slowly driven up the platform by a driver 61. The bottoms of the cartons 59 have been removed so that when one of the cartons comes into registry with one of the openings 57, the stack of the cups 21 therein falls into the tube 49. The carton is too large to fall through the opening 57 and is ultimately moved into contact with a curved ejector 61a (FIGS. 4 and 8) which cams the empty carton laterally off of the platform 55. The ejector 61a is suitably mounted above the platform 55 by a frame 61b. The driver 61 moves the cartons 59 up the platform 55 in timed relationship to movement of the conveyor belt 25 so that the tube 49 will always have some of the cups 21 in it.

FIGS. 1 and 4 through 6 show a preferred construction of the apparatus for loading the cups 21 into the tube 49, it being understood that other devices could be employed to accomplish this purpose. The driver 61 includes outer frame members 62, a central frame member 63, a web 64 joining the members 62 and 63, and a pair of upstanding plates 65 affixed to the web 64 and engageable with one of the cartons 59. The driver 61 is mounted for movement along the platform 55 and is guided in this movement by stationary side walls 67 of the platform and by pins 69 on the frame 63 which project under a flange 71 (FIG. 6) suitably mounted on the platform 55. When the driver 61 reaches the upper end of its stroke, the pins 69 are in registry with slots 73 formed in the flanges 71 to thereby permit the driver 61 to be manually lifted slightly above the platform 55 and returned to a starting position near the bottom of the platform with the pins 69 being reinserted beneath the flange 71 through slots 76.

Although the driver 61 could be driven in different ways, in the embodiment illustrated it is driven by a plurality of lugs 77 mounted on an endless chain 79 which in turn is mounted on a pair of sprockets 81. One of the sprockets 81 is driven by the motor 23 (FIG. 1) through a suitable gear reduction box (not shown) and a belt drive 83. The central frame member 63 of the driver 61 has spaced downwardly opening notches 87 therein each of which is adapted to partially receive one of the lugs 77 and cooperate therewith to permit the lugs to drive the driver 61.

The upper portion of the conveyor belt 25 between the wheels 27 can be suitably supported along its edges by a pair of frame members 89 (only one being shown in FIG. 1). A pair of side walls 91 (FIGS. 1–3) are suitably mounted on the supporting structure 13 and project upwardly closely adjacent opposite edges of the conveyor belt 25. An upstream dam 93 and a downstream dam 95 are suitably mounted on the side walls 91. The space between the dams 93 and 95 constitutes an ice loading or filling station.

Means are provided for delivering ice to a location intermediate the dams 93 and 95 with such means, in the embodiment illustrated, being in the form of an ice shaver 97 (FIGS. 1 and 2). The ice shaver 97 is suitably mounted on the supporting structure 13 above the conveyor belt 25. The ice shaver 97 includes a hopper 99 to which chunks or cubes 101 of ice can be supplied.

Although various forms of ice shavers could be employed, in the embodiment illustrated the chunks of ice 101 are directed by the hopper 99 against a rotatable crushing wheel 103. The wheel 103 has a plurality of crushing members 105 attached thereto and, in the embodiment illustrated, each of the crushing member is notched or castellated as shown in FIG. 7. The ice chunks 101 are forced between the wheel 103 and a stationary anvil 107 and are crushed by the action of the wheel and the crushing members 105 and the anvil 107.

To prevent the chunks of ice from packing above the wheel 103, a rotatable paddle wheel 109 is provided in the hopper 99 above the wheel 103. As shown in FIGS. 1 and 7, the paddle wheel 109 includes a plurality of paddles 111 (four being illustrated in FIG. 1), each of which is castellated as shown in FIG. 7 to define a plurality of generally radially extending fingers 113. The ice chunks will not pack between or tend to adhere to a paddle wheel of this configuration.

The crushing action of the shaver 97 converts the ice chunk 101 into smaller fragments or shavings. The ice fragments fall down a chute 115 and are delivered to a location intermediate the dams 93 and 95. The chute 115 terminates closely adjacent the upper surface of the conveyor belt 25. The chute 115 delivers the ice to the desired location and prevents any substantial ice build up on the conveyor belt 25 from passing therebelow toward the dam 95.

A blade or paddle 117 is rotatably mounted on a shaft 119 which in turn is suitably mounted on a supporting structure 113. The blade 117 is mounted so that the outer edge thereof passes closely adjacent a lower region of the chute 115 and the upper surface of the conveyor belt 25 as the blade rotates. In the embodiment illustrated, the blade 117 rotates in a clockwise direction so that its tangential movement in the straight-down or 6 o'clock position is opposite to the direction of movement of the conveyor belt 25 between the dams 93 and 95. The rotational axis of the blade 117 is transverse to the direction of movement of the conveyor belt 25 between the dams 93 and 95.

The blade 117 performs three important functions. First, it propels the ice fragments rearwardly, i.e. toward the dam 93 to supply ice for first stage ice fill adjacent the dam 93. Secondly, it propels some of the ice fragments generally downwardly into the cup 21 passing beneath the blade 117 and the chute 115 to provide a second stage ice fill. Third, because the outer edge of the blade 117 passes in close proximity to the chute 115 and the upper surface of the conveyor belt 25, it performs a wiping action to prevent a build-up of ice on the chute 115 and the conveyor belt 25.

The dam 93 in the embodiment illustrated is in the form of a plate having a curved lower edge portion 121 which terminates closely adjacent the conveyor belt 25. The dam 93 prevents ice from moving to the left of the dam, as viewed in FIG. 2.

An auger 123 is mounted for rotation on the supporting structure closely adjacent the dam 93 with the axis of rotation of the auger extending transverse to the direction of movement of the conveyor belt between the dams 93 and 95. The auger 123 extends substantially between the side walls 91 and there is only a very slight clearance between the auger and the curved portion 121 of the dam 93. As best shown in FIG. 2, the curved portion 121 conforms to a peripheral portion of the auger 123.

The auger 123 performs several important functions. For example, it prevents ice build-up on the dam 93. The auger 123 spreads the ice fragments laterally so that both of the side-by-side cups will receive a first stage filling of ice fragments. The auger 123 also moves any excess ice which may build up adjacent the dam 93 laterally through an opening 125 (FIG. 3) in one of the side walls 91. This prevents the ice fragments from building up adjacent the dam 93. If desired, the auger 123 may be considered as a portion of the dam 93 in that it also inhibits movement of the ice fragments to the left.

A compactor 127 is suitably mounted on the supporting structure 13 for compacting the ice fragments in the cups 21 intermediate the first and second ice fill stages. One of the compactors 127 is provided for each row of cups 21, and accordingly two identical compactors 127 are provided (FIG. 3). The compactors 127 are mounted in side-by-side relationship at a compacting station which lies within the total ice filling station. The compactors 127 are constructed and arranged so that each of them performs an ice compacting function without damaging the cups 121 and without necessitating stopping of the conveyor belt 25.

Each of the compactors 127 includes an elongated rod 129 having an enlarged head 131 affixed to the rod at the lowered end thereof. The head 131 is sized to be received within the upper end portion of the cups 21 and has a flat bottom face. Each of the ice compactors 127 is mounted for movement generally toward and away from the conveyor belt 25 and for movement in the direction of movement of the conveyor belt so that the compactor can carry out its compacting function while the conveyor belt is moving. In the embodiment illustrated, this is accomplished by a pivotable guide 133 and a rotatable crank 135, both of which are suitably mounted on the supporting structure 13. The rod 129 is slidably received within the guide 133 so that the rod can reciprocate in the guide. The guide 133 for each of the compactors is pivotally mounted by a common pin 137. The upper end of the rod 129 is connected to the crank 135 which in turn is mounted for pivotal movement about a pin 139. The rotational axes of the arm 129 and the crank 135 are parallel to each other and transverse to the conveyor belt 25.

The crank 135 is rotated in any suitable manner by the drive motor 23 in timed relation to movement of the conveyor belt 25. This causes the rod 129 and the head 131 to undergo a form of rotary motion. With this arrangement, the head 131 enters one of the cups 21 and moves with such cup 21 and the conveyor belt 25 for a short period of time. Simultaneously, the head 131 is moved downwardly into the cup to compact the ice and ultimately upwardly out of the cup. The head 131 is then moved rearwardly to enter a second of the cups 21 and the above-described action is repeated.

After the second stage ice filling operation, the cups pass beneath a leveler 141. In the embodiment illustrated, the leveler 141 includes a hub 143 and a plurality of vanes 145 which extend both axially and circumferentially of the hub to define recesses 147 therebetween. The vanes 145 preferably extend along helical paths on the periphery of the hub 143. The hub 143 is mounted for rotation about a pivotal axis extending transverse to the direction of movement of the conveyor 25 between the dams 93 and 95. As the leveler 141 rotates, the vanes 145 lightly contact or are spaced only very slightly from the upper faces 45 of the conveyor sections 33. Preferably, the leveler 141 rotates in a direction so that the vane 145 in contact with the face 45 is moving in the same direction as the face which is being contacted. In the embodiment illustrated, the leveler 141 rotates in a counterclockwise direction.

The primary purpose of the leveler 141 is to cause the ice fragments in the counterbore 39 to be substantially flush with the face 45. The vanes 45 accomplish this much better than a cylindrical roller. Because the recesses 147 extend both axially and circumferentially of the leveler 141, ice is not packed therein but is forced out of the recesses.

The dam 95, in the embodiment illustrated, is in the form of a cylindrical roller mounted for rotation by shaft 149 for pivotal movement about an axis extending transverse to the direction of movement of the conveyor belt 25. Preferably, the roller rotates in the same direction as the leveler 141.

The primary function of the roller 95 is to prevent ice fragments which are not in the cup 21 or the counterbore 39 from being moved by the conveyor downstream of the roller. If a stationary dam were used, ice would tend to build up behind the upstream side of the stationary dam.

The next work operation involves deforming of the ice fragments, particularly those fragments in the counterbore 39. This is accomplished by a rotor or shaping wheel 151 (FIGS. 1-3) located downstream of the dam 95. One of the rotors 151 is provided for each row of containers 21, and accordingly, in the embodiment illustrated, two identical rotors are provided (FIG. 3). Each of the rotors 151 includes a hub 153, and the hubs are mounted for rotation by a common shaft 155. The shaft 155 is suitably mounted on the supporting structure 13 such that the rotational axis of the rotors 155 is transverse to the direction of movement of the conveyor belt 25 therebelow.

Each of the rotors 151 also includes a plurality of shaping or deforming sections, each of which in the embodiment illustrated is in the form of a radially extending cup 157. The cups 157 are spaced circumferentially along the rotor 151 so that each of the cups will enter one of the counterbores 39. Each of the cups 157 defines a cup-shaped cavity 159 which opens radially outwardly.

As the rotors 151 rotate and the conveyor belt 25 moves, one of the cups 157 begins to enter one of the counterbores 39 of one of the conveyor sections 33. An important function of the rotor 151 is that the cup 157 engages and shapes the ice in the counterbore 39 into the desired configuration which, in the embodiment illustrated, is generally in the form of a hemisphere or dome 161. The shaping of the ice fragments in the counterbore 39 may also involve some additional compaction of these ice fragments. The concept of employing the rotors 151 in association with the continuously moving conveyor belt 25 is applicable to shaping and/or compacting the ice fragments while the conveyor belt moves continuously.

The rotors 151 are driven by the conveyor belt 25. Specifically, the engagement of the cups 157 with the ice fragments in the counterbore and/or with the wall of the counterbore provides a driving connection between the conveyor belt 25 and the rotors 151. This assures that the rotors 151 and the conveyor belt 25 will move together in the proper timed relationship and further eliminates any special driving connection between the rotors and the motor 23.

The cup 21 is then moved by the conveyor belt 25 to a syrup dispensing station downstream of the rotors 151. A syrup dispenser 163 is located at this station and includes a plurality of syrup dispensing heads 165, each of which may dispense a syrup of a different flavor. The syrup dispensing heads 165 may be actuated in any suitable manner, such as by a photoelectric circuit which senses the presence of a cup 21 and actuates the heads 165 to cause them to dispense syrup on the ice fragments therebelow. The cup 21, the ice fragments, and the syrup deposited thereon forms a confection 167 (FIG. 1).

The confections 167 must then be removed from the conveyor belt 25. To accomplish this, a ramp 169 (FIGS. 1 and 8) is mounted on the supporting structure 13. After the confections 167 pass through the syrup dispenser 163, the lower tips thereof engage the ramp 169. As the conveyor belt 25 continues to move the confections 167 to the right, the confections are cammed upwardly by the ramp 169. A pair of spaced parallel rods 171 (FIG. 8) are suitably mounted on the supporting structure on opposite sides of the confection 167. A second pair of the rods 171 (not shown) is provided for the other row of the confections 167. The rods 171 begin just prior to the right-hand edge of the ramp 169. Accordingly, prior to the time that the cups 21 lose the support of the ramps 169, the conveyor belt 25 moves the raised confections 167 between the rods 171 as shown in FIG. 8. The rods 171 extend upwardly away from the conveyor belt 25 as they move downstream, i.e. to the right as viewed in FIG. 1.

A confection drive mechanism 173 (FIGS. 1 and 8) moves the confections along the rods to a discharge station at the end of the machine 11. In the embodiment illustrated, the drive mechanism 173 includes a pair of chains 175 (only one being illustrated in FIGS. 1 and 8), several sprockets 177 for guiding and driving the chain 175, and a plurality of spaced parallel cross members 179 extending between the two chains 175. Each of the cross members 179 contacts one of the cups 21 to slide the latter along the rods 171. The chain 175 is driven by the motor 23 in any suitable manner in timed relationship to the movement of the conveyor belt 25 so that the operation of the drive mechanism 173 will be properly synchronized with conveyor movement.

Near the outlet of the machine 11, the rods 171 are inclined downwardly so that the confections 167 can move therealong under the influence of gravity. The confections 167 may be removed from the machine 11 manually or by suitable automatic material handling devices. The frozen confections 167 can then be deposited either manually or automatically in suitable packaging for transportation and/or storage.

To prevent ice from sticking to various parts of the machine 11 which come into contact with the ice fragments, these parts of the machine are preferably constructed of or coated with an epoxy material to which ice will not adhere. For example, the dams 93 and 95, the auger 123, the compactor 125, the blade 117, the chute 115, the leveler 141, the conveyor sections 33, and the rotors 151 may all be constructed of or coated with this material. This epoxy material may be of the type sold under the trademark Vibro-flo and designated as No. E-300 Nylon, such material being available from Duracoat Co., Garden Grove, Calif. 92645.

In operation of the machine 11, the motor 23 drives the endless conveyor belt 25 continuously. The fingers 53 are rotated in timed relationship to the conveyor belt 25 by the motor 23 to deposit a cup 21 in each of the openings in the conveyor section 33 immediately therebelow. The cups 21 so loaded into the conveyor section 33 are moved beneath the auger 123 at which time an initial charge of ice fragments is deposited in each of the cups. This ice is compacted by the compactor 127, and then a second charge of ice is deposited in the cups as they near the vicinity of blade 117.

The cups then pass beneath the chute 115 which minimizes the amount of ice fragments above the surface 45 which can be moved past the chute. Subsequently the ice in the counterbores 39 is leveled flush with the upper surface 45 of the conveyor section 33 by the leveler 141. The dam 95 substantially prevents ice not properly associated with one of the containers from passing to the right of the dam.

Next, one of the cups 157 of each rotor 151 engages the ice in the counterbores to shape it to a hemispherical configuration. The rotors 151 are driven by the conveyor belt 25 by virtue of the cooperation between the cups 157 and the counterbores 39 and/or the ice in the counterbores. The syrup dispenser 163 then deposits syrup on the ice fragments in the cup. Subsequently the confection 167 is lifted by the ramp 169 and transferred the rods 171 where the drive mechanism 173 causes movement of the confections to the outlet of the machine 11.

Although exemplary embodiments of the invention have been shown and described, many changes, modifications and substitutions may be made by one having ordinary skill in the art without necessarily departing from the spirit and scope of this invention.

We claim:

1. A machine for making a confection including an open top container and ice fragments, said machine comprising:
    a supporting structure;
    a conveyor mounted for movement on said supporting structure, said conveyor including a plurality of container mounts;
    means for moving said conveyor so that said container mounts are moved through a plurality of stations;
    first and second dams mounted on said supporting structure adjacent said conveyor, said dams being spaced from each other so that said conveyor conveys the containers from the first dam to the second dam;
    means for delivering ice fragments to a location intermediate said dams;
    first means for moving the ice fragments from said location toward said first dam;
    each of said container mounts being adapted to hold one of the containers so that ice fragments can be deposited in the containers from above while such container is intermediate said dams;
    compacting means intermediate said dams for compacting ice fragments in the containers between said dams; and
    shaping means for shaping at least an outer portion of the ice fragments in the containers, said conveyor moving the containers from the second dam to the shaping means.

2. A machine as defined in claim 1 wherein said means for delivering includes a chute terminating adjacent said conveyor and said first means includes a rotary element adjacent said chute and adjacent said conveyor.

3. A machine as defined in claim 1 including side walls on opposite sides of the conveyor between said dams for retaining ice fragments on the conveyor and auger means for spreading the ice fragments laterally of the conveyor between said side walls.

4. A machine as defined in claim 3 wherein at least one of said side walls has an aperture therein adjacent said auger means to allow excess ice fragments to pass through said aperture.

5. A machine as defined in claim 1 wherein dsaid second dam includes a roller having an axis of rotation generally transverse to the direction of conveyor movement between said dams.

6. A machine as defined in claim 1 wherein each of said container mounts includes at least one aperture in said conveyor for receiving one of the containers, said machine including leveling means for leveling off the amount of ice fragments supplied to each of the containers, said leveling means between intermediate said location and said shaping means.

7. A machine as defined in claim 6 wherein said leveling means includes a rotatable wheel having a plurality of recesses extending both axially and circumferentially of said wheel.

8. A machine as defined in claim 6 wherein the upper end of each of the containers lies below the rim of the associated aperture whereby each of said apertures defines a pocket above the associated container, said pockets being filled substantially level full by said leveling means, said shaping means including a shaping wheel including a plurality of cup-shaped shaping members adapted to be received in said apertures above the containers to give the ice fragments at the top of each container a rounded appearance, said shaping wheel being driven by the conveyor through the cooperation of the shaping member and the confection.

9. A machine for making a confection wherein the confection includes an open top container and ice fragments, said machine comprising:
a supporting structure;
an endless conveyor mounted for movement on the supporting structure, said conveyor having a plurality of apertures, each of said apertures being adapted to receive one of the containers with the upper end of each of the containers lying below the rim of the associated aperture whereby each of the apertures defines a pocket above the associated container;
means for moving the conveyor through a plurality of stations;
means at a first of said stations for depositing ice fragments in the containers and pockets when the containers are at said first station;
a shaper mounted for rotation at a second of said stations;
said shaper including a hub and a plurality of shaping members mounted on said hub and projecting generally radially thereof; and
each of said shaping members having a generally cup-shaped recess opening radially outwardly, each of said shaping members being receivable in one of said pockets with the recess of such shaping member receiving at least some of the ice fragments in such pocket to shape the same.

10. A machine as defined in claim 9 wherein the shaper is driven by the moving means through the engagement of the shaping members and the confection whereby synchronism in the movements of the moving means and the shaper is assured.

11. A machine as defined in claim 9 wherein the portion of said shaping members which contacts the ice fragments contains a coating of material to which ice will not adhere.

12. A machine for making a confection including an open top container and ice fragments, said machine comprising:
a supporting structure;
an endless conveyor mounted for movement on said supporting structure, said conveyor including a plurality of container mounts, each of said container mounts being adapted to hold at least one of the containers;
means for continuously moving said conveyor so that said container mounts are moved through a plurality of locations;
first means for depositing ice fragments in the containers as the containers are moved through a first of said locations;
second means for depositing additional ice fragments in the containers as the containers are moved through a second of said locations;
ice compactor means at a third of said locations for compacting the ice in the containers as the containers are conveyed through said third location whereby the conveyor can move the containers continuously through said third location, said third location being intermediate said first and second locations;
deforming means at a fourth of said locations for deforming the ice fragments in the containers as the containers are conveyed through said fourth location, said containers reaching said fourth location after passing through said first, second and third locations; and
said deforming means includes a rotor with a plurality of cup-shaped recesses, each of the cup-shaped recesses being adapted to receive and shape some of the ice fragments in one of the containers, said rotor being driven by the conveyor through the engagement of the cup-shaped recesses and the ice fragments.

13. A machine as defined in claim 12 wherein said conveyor includes a plurality of pivotally connected segments, each of said container mounts including a recess in one of said segments for receiving one of said containers.

14. A machine as defined in claim 12 wherein said ice compactor means includes a compactor and means for mounting the compactor for reciprocation generally toward and away from the conveyor and for movement along an arcuate path.

15. A machine for making a confection wherein the confection includes an open top container and ice fragments, said machine comprising:
a supporting structure;
an endless conveyor mounted for movement on said supporting structure, said conveyor including a plurality of container mounts, each of said container mounts being adapted to releasably hold at least one of the containers;
means for continuously moving said conveyor so that said container mounts are moved continuously through a plurality of stations;
means for releasably retaining a plurality of the containers at a first of said stations;
means on said supporting structure for transferring containers from the retaining means to the container mounts as the container mounts move through said first station;
means mounted on said supporting structure at a second of said stations for depositing ice fragments in the containers as the containers are moved by said conveyor through said second station;
an ice compactor at a third of said stations for engaging and compacting the ice in the containers;
means for mounting said ice compactor on said supporting structure for movement generally toward and away from the conveyor and generally in the direction of movement of said conveyor at said third station whereby the compactor can engage and compact the ice in each of said containers as such containers are continuously fed through the third station; and said depositing means deposits ice in the containers at first and second locations and said compactor compacts the ice fragments at a location intermediate said first and second locations, said machine including a rotatable shaping wheel at a fourth of said stations for shaping the ice fragments in said containers as the containers are conveyed through the fourth station.

16. A machine as defined in claim 15 wherein said rotor includes a plurality of surfaces, each of said surfaces defining a cup-shaped recess which is adapted to receive at least some of the ice fragments in one of the containers as such container is moved through the fourth station, each of said surfaces compacting and shaping the ice fragments in one of said containers, said rotor being driven by said conveyor through the engagement of the surfaces and the confection whereby synchronism in the movements of the conveyor and the rotor is assured.

* * * * *